United States Patent
Sakai

[11] Patent Number: 6,136,226
[45] Date of Patent: Oct. 24, 2000

[54] NOCTILUCENT OR FLUORESCENT ARTIFICIAL STONE COMPOSITION

[75] Inventor: Mieko Sakai, Tokyo, Japan

[73] Assignee: Doppel Co., Ltd, Tokyo, Japan

[21] Appl. No.: 09/180,330

[22] PCT Filed: Mar. 5, 1997

[86] PCT No.: PCT/JP97/00681
§ 371 Date: Dec. 31, 1998
§ 102(e) Date: Dec. 31, 1998

[87] PCT Pub. No.: WO98/39268
PCT Pub. Date: Sep. 11, 1998

[51] Int. Cl.⁷ .......... C04B 26/02; C04B 14/02; C04B 14/06; C04B 14/22; C08J 5/00
[52] U.S. Cl. ............. 252/301.35; 252/301.34; 252/301.36; 252/301.4 R; 252/301.4 F
[58] Field of Search ......... 252/301.36, 301.4 R, 252/301.35, 301.34

[56] References Cited

U.S. PATENT DOCUMENTS 2,392,814  1/1946  Froelich ............... 252/301.4 R
3,294,699  12/1966  Lange ................. 252/301.4 R

FOREIGN PATENT DOCUMENTS 483891    5/1992  European Pat. Off. ........ 252/301.36
58-1759   1/1983  Japan ...................... 252/301.34
60-137862 7/1985  Japan .

Primary Examiner—C. Melissa Koslow
Attorney, Agent, or Firm—Wenderoth, Lind, & Ponack, LLP.

[57] ABSTRACT

Provided is a luminous or fluorescent artificial stone composition in which the resin content is 11% by weight or less, from 0.3 to 1.0 $W_1$ of a weight ($W_1$) of a fine powder component of an inorganic material having a size of from 10 to 70 mesh is a fine powder component of a transparent inorganic material, and a weight ($W_2$) of a finely divided component of an inorganic material having a size of 100 mesh-under and a weight ($W_3$) of a luminous or fluorescent component of 100 mesh-under have the following relationship $$W_1:(W_2+W_3)=1:2 \text{ to } 5:1$$

$$W_2:W_3=1:2 \text{ to } 5:1.$$

10 Claims, No Drawings

NOCTILUCENT OR FLUORESCENT ARTIFICIAL STONE COMPOSITION

BACKGROUND OF THE INVENTION

1. Technical Field

The invention of the present application relates to a luminous or fluorescent artificial stone composition. More specifically, the invention of the present application relates to an artificial stone composition which has a night decorativeness, a luminousness, such as a luminescence and a light-emitting property, accompanied by ultraviolet absorption and which is useful in a building material or a sight material as a direction indicator or a position guide using light in dark surroundings.

2. Description of Prior Art

An artificial stone obtained by pulverizing a natural stone and mixing the pulverizate with a resin or the like for solidification is known. Regarding this artificial stone, various attempts have been made to provide a product having a design with a tone of a natural stone, such as marble, granite or the like, and having an excellent hardness and strength.

As an approach to improve properties and a performance of such an artificial stone, there has been made also a proposal of imparting a light function using a luminous material, such as a luminescent material or a fluorescent material such as an ultraviolet light-emitting material which emits light through ultraviolet absorption. This approach is conducted by mixing a fluorescent material with a resin component as a binder of an artificial stone for solidification or by mixing a luminescent fluorescent material, such as strontium aluminate or the like, or a ultraviolet fluorescent material with an ubsatuarated polyester, a methacrylic resin, a glass or the like for solidification, pulverizing the mixture, and using the resulting product as an aggregate to form an artificial stone.

However, in the case of the conventional luminous or fluorescent artificial stone, there were defects that in either of the above-mentioned methods, it is only in the position where the binder resin component or the aggregate exposed to the surface of the artificial stone is arranged that the luminescent material or the like acts and the luminescent material or the like contained in the artificial stone molded product does not act at all. A luminous material, such as a luminescent material or the like, is quite expensive, and even the addition of the same in a small amount increases an overall cost to from 3 to 10 times. Accordingly, an ordinary artificial stone containing therein a luminous material free from this function was not practical in view of the cost. Further, light was emitted only in the surface layer of the artificial stone, so that light emitted does not have a thickness. Thus, there is a problem that the use thereof was quite limited because of such a high cost and the limited luminousness.

Meanwhile, when the amount thereof is controlled for decreasing the cost, there occurs such an inconvenience that the luminous or luminescent functional effect is scarcely provided.

Accordingly, the realization of a new artificial stone which is obtained with the use of a luminous or fluorescent material, such as a luminescent material or the like, in a lesser amount for decreasing the cost to improve a light function of an artificial stone, which is excellent in the functional effect, and which can fully provide a thickness of light emitted in not only the surface but also the whole of the artificial stone, has been in demand.

OBJECT OF THE INVENTION

In order to solve the above-mentioned problems, the invention of the present application provides a luminous or fluorescent artificial stone composition containing a fine powder component of a transparent inorganic material having a size of from 5 to 70 mesh, a finely divided component of an inorganic material having a size of 100 mesh-under, a luminous or fluorescent component of 100 mesh-under having a luminescence or a luminousness accompanied by ultraviolet absorption, and a resin component, characterized in that the sum of the weights of the above-mentioned fine powder component of the transparent inorganic material, finely divided component of the inorganic material and luminous or fluorescent component is 89% by weight or more based on the total artificial stone composition, the weight of the resin component is 11% by weight or less based on the total artificial stone composition, the ratio of from 30 to 100% of the weight ($W_1$) of the fine powder component of the inorganic material is a fine powder component of a transparent inorganic material, the ratio of the weight ($W_1$) of the fine powder component of the transparent inorganic material to the sum ($W_2+W_3$) of the weight ($W_2$) of the finely divided component of the inorganic material and the weight ($W_3$) of the luminous or fluorescent component is $W_1:(W_2+W_3)=1:2$ to $5:1$, and the ratio of the weight ($W_2$) of the finely divided component of the inorganic material to the weight ($W_3$) of the luminous or fluorescent component is $$W_2:W_3=1:2 \text{ to } 10:1.$$

DETAILED DESCRIPTION OF THE INVENTION

The invention of the present application is described in more detail below.

With respect to the composition of the artificial stone, in the present invention, a fine powder component of an inorganic material having a size of from 5 to 70 mesh is first contained as a basic component. This fine powder component may include a variety of natural or synthetic materials. Examples thereof include minerals such as silica rock, chrysolite, feldspar, quartz, mica and the like, natural stones such as granite, metamorphite and the like, glasses, porcelain, metals and the like.

However, in the artificial stone composition of the present invention, it is indispensable that the ratio of from 30 to 100% of the weight of this fine powder component incorporated is a transparent inorganic material fine powder component.

The fine powder component of the transparent inorganic material refers to a component of an inorganic material having substantially a high light transmission. The transparency thereof includes various degrees. A natural or synthetic inorganic material having a relatively high light transmission is to be used in the present invention. Consequently, the fine powder component of the transparent inorganic material may be colored or have a peculiar color.

Quartz, silica rock, a glass and the like are typically mentioned in the present invention as the fine powder component of the transparent inorganic material. However, it is not limited thereto. A fine powder component of an inorganic material having an appropriate transparency, including silica rock, quartz and a glass, is available.

Further, along with this fine powder component, a finely divided component of an inorganic material having a size of 100 mesh-under is used as a second component of the present invention. As the finely divided component, various natural or synthetic finely divided components are mentioned. For example, powders of calcium carbonate, aluminum hydroxide and silica rock are easily obtainable finely divided components. And the use of the finely divided component of the inorganic material having a relatively high light transmission like the fine powder component of the inorganic material is preferable to bring about a greater effect in the present invention.

Further, as a part of this finely divided component, a component such as manganese dioxide, titanium dioxide, zirconium silicate, iron oxide or the like to adjust a color tone, or a component such as antimony trioxide (pentoxide), a boron compound, a bromine compound or the like to impart a flame retardance and an incombustibility may be blended.

The artificial stone of the present invention contains, as a third component, a luminous or fluorescent component of 100 mesh-under having a luminescence or a luminousness accompanied by ultraviolet absorption. Typical examples of such a component include a strontium aluminate luminescent material, zinc sulfide and the like. These various materials are used in the present invention.

The above-mentioned fine powder component plays a roll as an aggregate of the resulting artificial stone, and acts as a main factor in the appearance and the physical properties.

With respect to this fine powder component, 30% or more of the amount has to be a transparent material.

The fine powder component of the inorganic material that plays a roll as an aggregate of the artificial stone has to have the size in the range of from 5 to 70 mesh as noted above. This is an indispensable requirement in the combination with the finely divided component of the inorganic material. Meanwhile, the size of the finely divided component is much smaller than the 100-mesh level in comparison to the fine powder component. The finely divided component enters between the individual particles of the fine powder component and is arranged to fill the space between the particles, contributing toward providing properties, such as hardness and pliability of the resulting artificial stone.

The above mentioned luminous or fluorescent component plays the same roll as the finely divided component, and a light function such as a luminousness or a fluorescence is imparted to the artificial stone. It is also indispensable that the luminous or fluorescent component has, like the finely divided component, a size of 100 mesh-under.

With respect to the above-mentioned inorganic material components, the mixing ratio is, along with the size, an important requirement.

That is, in the artificial stone composition of the present invention, it is indispensable that the relationship of the weight ($W_1$) of the above-mentioned fine powder component of the inorganic material, the weight ($W_2$) of the finely divided component of the inorganic material and the weight ($W_3$) of the luminous or fluorescent component is as follows.

$W_1:(W_2+W_3)=1:2$ to $5:1$ $W_2:W_3=1:2$ to $10:1$

With respect to $W_1:(W_2+W_3)$ it is preferably between 1:1 and 4:1. With respect to $W_2:W_3$, it is preferably between 1:1 and 5:1.

In the fine powder component of the inorganic material, as mentioned above, it is advisable that the ratio of the fine powder component of the transparent inorganic material therein has preferably the following relationship (0.3 to 1.0)$W_1$.

The above-mentioned facts are required to realize physical properties as an artificial stone, such as strength, hardness, density and the like, and a light function such as a luminousness or a fluorescence.

Specifically, the size of each component is selected, as required, depending on a size and a mixing ratio of each component used in combination. Generally, it is preferable that the size of the finely divided component and the luminous or fluorescent component is between 100 and 250 mesh.

Further, in the present invention, the resin component is indispensable as a fourth component, and this can be selected from a wide variety of thermosetting materials.

For example, an acrylic resin, a methacrylic resin and an unsaturated polyester resin are mentioned. Of these, the methacrylic resin is preferable in view of a transparency, a hardness, a strength and the like. The mixing ratio of the resin component in the artificial stone composition of the present invention is 10% by weight or less based on the total composition. This resin component contributes toward covering the fine powder component and the finely divided component which are components forming the above-mentioned structure to bind the whole body, and functions to impart a resilience or a tensile strength to a product when an artificial stone is completed. The ratio of the aggregate of the inorganic material comprising the fine powder component, the finely divided component and the like is limited by corresponding to the mixing ratio of this resin component. That is, it has to be between 89 and 95% in terms of the weight ratio. When it exceeds 95%, the product becomes brittle and is hard to use. Further, when it is less than 89%, the product becomes too soft to give qualities as a stone. Thus, the product is used in the same range as a resin plate.

From the standpoint of the resin component, when the amount of the resin component exceeds 11%, the product is like plastics, and it is only seemingly an artificial stone. Further, when the amount of the resin component is excessively decreased, a product comes to have an appearance close to a natural color, but it becomes brittle and is unsuitable for actual use. From this standpoint, the amount of the resin component is more preferably between 5 and 11% by weight.

In practicing the present invention, the ratios of these components are important. In the present invention, one of the characteristic features is that a high-density product having a dense texture can be provided. The high density here referred to means that the fine powder component and the finely divided component contained in the artificial stone product are present in a high density. For example, this density is 2.2 g/cm$^3$ or more which exceeds the range in the conventional artificial stone.

The light function of the artificial stone is further described. With respect to the artificial stone of the present invention, the light function of the luminous or fluorescent artificial stone is realized in such a manner that 1) from 30 to 100% by weight of the fine powder component of the inorganic material is a fine powder of a transparent inorganic material, and likewise from 30 to 100% by weight of the finely divided component of the inorganic material is a finely divided component of a transparent inorganic material, and 2) a luminous or fluorescent component of 100 mesh-under is mixed at the above-mentioned specific ratio. And the characteristic feature in this case is that light can be emitted as light having a thickness. It is not that light is emitted in the surface layer alone as in the prior art, but that light is emitted in the overall thickness of an artificial stone.

Thus, the product is excellent in the luminousness and the economics in view of the use of an expensive luminous or fluorescent component.

The reason is as follows. The use of the fine powder component of the transparent inorganic material as a transparent aggregate permeates light emitted from outside into the inside of the artificial stone to efficiently absorb the light energy in the luminous or fluorescent component, and the fluorescent layer having dispersed therein the luminous or fluorescent component formed of the luminescent material or the like is secured as a great thickness including the inside of the artificial stone, So that a high luminosity can be maintained for a long period of time. In the light emission, the fine powder component of the transparent inorganic material comes to have a high luminosity because it is good in a light transmission.

The ratio of the transparent component occupied in the overall fine powder component is, as mentioned above, between 30 and 100% by weight. Naturally, in some physical properties of an artificial stone, such as a strength and the like and some external design, a ratio of 100is preferable from the standpoint of a light function. Of course, this is not critical. However, when it is less than 30% by weight, a desired light function is hardly provided.

By the way, in producing the artificial stone of the present invention, a part of the above-mentioned transparent fine powder component may be baked with a luminous or fluorescent component or coated therewith at room temperature.

With respect to the coating of the fine powder component provided by the baking, a coating having a thickness of from several micrometers to several tens of micrometers, for example, from 5 to 50 $\mu$m to 50 $\mu$m, preferably from 20 to 40 $\mu$m is applied to the surface of the particle in the transparent fine powder component. More specifically, the coating is applied by the baking at a high temperature of from 120 to 1,200° C.

The fluorescent material to be baked can include the above-mentioned various fluorescent materials which have a luminescence or which emit light through ultraviolet-light irradiation, such as strontium aluminate, zinc sulfide and the like.

The baking is conducted not by various known methods, but by mixing the aggregate of the transparent inorganic material, for example, the above-mentioned fine powder component with a dispersion or a paste having dispersed therein a fine powder of a luminescent material such as strontium aluminate or the like and drying the mixture.

Further, the coating provided by the coating at room temperature can also be formed using a transparent sticky material (binder) in the above-mentioned dispersion or paste.

Incidentally, what is important in the high-density artificial stone of the present invention is that the inorganic material component is preferably dispersed uniformly in any portions of the product except in special cases.

It is advisable that the outer surface of the product is polished or roughened. In practice, it is preferable that the broken fine powder component is exposed.

The polishing is a practically convenient method for exposing the dense texture condition inherent in the high-density artificial stone having a deep atmosphere in the present invention. It is, of course, possible that a part of a surface of a product is polished to expose the fine powder component and a difference with another portion in the same surface is used as a pattern.

Further, when an artificial stone is obtained, it is an important problem what a desired color or design is. Granite or marble is one goal because a product formed of a natural stone is hardly obtained and a color and a glaze thereof are beautiful. In the present invention, the transparent component is used as the fine powder component, making it possible to obtain a product having a glaze of granite, marble or the like. This is because a fine powder obtained by pulverizing a quartz-type natural stone is used as the fine powder component.

The fine powder obtained by pulverizing the quartz-type natural stone is colorless and transparent in many cases. In a non-transparent powder, a transparent often remains slightly.

It is also possible to provide a uniform color and a deep, glazed peculiar tone of color by adding an inorganic pigment, an organic pigment such as an azo pigment or a phthalocyanine pigment, or various dyes.

In the artificial stone composition of the present invention, the product can also be colored by using colored particles having the same size as the fine powder component, as a color component.

In any case, the color reproducibility can be secured quite easily in comparison to the conventional artificial stone, and a product which is excellent in a dept and a glaze without discoloration can be obtained.

The high-density artificial stone of the present invention having usually excellent color tone characteristics along with a luminescence, an ultraviolet light-emitting property and the like can have any form, examples of the form being a plate, a bar, a cylinder and the like.

A molding method for this is variously selected. For example, injection molding and compression molding are considered as required.

In the compression molding method, a material (mixed material) obtained by previously mixing the fine powder component, the finely divided component and the resin component in amounts required in the composition after the completion of the molding and kneading them is charged in a female mold as a horizontal mold, a male mold is joined therewith, and these are pressed at a surface pressure of from 5 to 100 kgf/cm$^2$ to conduct the compression molding. And in this molding, the heating is conducted at a temperature of from approximately 90 to 140° C. for from 5 to 20 minutes in the compression.

Further, in this compression molding with the heating, vibration is applied to the mold along with the pressure, making it possible to improve a fluidity of the above-mentioned mixed material in the mold.

This process using such a compression molding exhibits a mass-production effect as a process for producing a product with a relatively simple shape, such as a flat molded product, and there is almost no loss of a material, so that this process is economically excellent too.

And in the present invention, the surface of the molded product after the molding may be roughened to expose the finely divided component to the surface portion.

To this end, a method of selectively removing the resin component is employed. That is, it is effective, for example, that after the product is removed from the mold, high-pressure water is jetted on the surface of the molded product to conduct the texture treatment.

Since this treatment varies depending on various conditions such as thickness, distance from a nozzle, treatment mode and the like, it is not limitative. However, usually, in the case of a thickness of from 2 to 20 cm, a water pressure of from 50 to 1,400 kg/cm$^2$ can be applied from a height of a nozzle of from 2 to 50 cm. This water pressure is far lower than when a natural stone is used.

That is because the high-quality treatment can be conducted more easily by the presence of a resin component.

A nozzle for jetting high-pressure water or its system is not particularly limited. Various types are employable.

The surface is flattened or roughened using the water jet in the texture treatment to produce an artificial stone having a deep quality.

The presence of the resin component does not make the surface cloudy, and makes easy the treatment of a waste water in comparison to an etching method using chemicals.

Naturally, the surface can be treated with an organic solvent, as required, to soften or melt the resin component and partially remove the same.

In this case, the organic solvent corresponding to the resin component may be selected. Examples thereof include halogenated hydrocarbons such as methylene chloride and chloroform, carboxylic acids and esters thereof such as acetic anhydride, ethyl acetate and butyl acetate, acetone, tetrahydrofuran, DMF and DMSO.

The molded product is dipped in these organic solvents or these organic solvents are sprayed thereon or caused to flow down thereon to remove the resin component softened or malted from the surface whereby the uneven surface can be formed.

Alternatively, the uneven surface may be formed by scratching the resin component having a low hardness from the surface with a wire brush, a cutting means or the like.

The surface is roughened by the above-mentioned various means, the texture is treated, and the surface is then polished as mentioned above, whereby the coating layer of the fine powder component on the surface is partially broken and this coating layer and the particles of the fine powder component are exposed to the surface of the product as sections. Consequently, the peculiar deep, glazed surface qualities are realized. This is attributed to the peculiar reflection phenomenon of light as noted above.

A means for surface polishing is not particularly limited. It can be conducted using a tool such as a grindstone, a polishing cloth, a polishing belt or the like, or a polishing agent such as a buff polishing agent, a rubbing compound or the like.

As the polishing agent, diamond, boron carbide, corundum, alumina and zirconia which have mainly a polishing action, and tripoli, dromite, alumina, chromium oxide and cerium oxide which have mainly a scratching action are used, as required.

Of course, after such a polishing is conducted, the surface may further be roughened to form raisings and depressions. However, in this case as well, the sections of at least a part of the particles of the fine powder component and the coating layer are exposed as mentioned earlier.

In this manner too, an artificial stone having excellent light-emitting properties, an excellent texture and excellent qualities is produced.

The present invention is illustrated by referring to the following Examples. Naturally, the present invention is not limited to the following Examples.

EXAMPLES

Example 1

The following components were uniformly mixed to form a mortar.

| | (% by weight) |
|---|---|
| Transparent natural silica rock (10 to 70 mesh) | 50 |
| Aluminum oxide (average particle diameter 220 mesh) | 10 |
| Transparent silica rock powder (average particle diameter 200 mesh) | 10 |
| Strontium aluminate luminescent material (average particle diameter 200 mesh) | 20 |

-continued

| | (% by weight) |
|---|---|
| Methyl methacrylate (MMA) (containing a 0.15% peroxide MMA curing agent) | 10 |

The resulting mixture was charged into a mold, and molded into a plate having a thickness of 11 mm.

Subsequently, the surface of the molded product was polished to a thickness of 10 mm using a diamond grindstone and a silicon carbide magnesia grindstone.

The resulting artificial stone exhibited a light-emitting property such as a luminousness in the overall thickness direction, had a deep milk-white color and a glaze of marble even in the daytime, and was free from bubbles in the inside or the surface. Thus, the composition was uniform.

In a test according to JIS K-7112, the specific gravity was 2.30. Further, the water absorption was 0.12%. The other properties are as shown in Table 1 below.

TABLE 1

| Item | Results | Test conditions |
|---|---|---|
| Bending strength | 31.23 kgf/cm | according to JIS A5209 |
| Compression strength | 1258 kgf/cm$^2$ | Crosshead speed 0.5 mm/min Load cell 2 tons |
| Impact strength | 4.57 kgf · cm/cm$^2$ | Pendulum impact test |
| Hardness | 998 kgf/mm$^2$ | Vickers hardness according to JIS Z-2244 |
| Linear expansion coefficient | 0.70 (× 10$^{-5}$ K) | TMA (30 to 100° C.) |
| Abrasion resistance | 0.02 g | JIS A-5209 sand dropping-type abrasion test |

Further, no abnormality was observed even in tests for an acid resistance and an alkali resistance by the dipping in a 3% hydrochloric acid aqueous solution for 8 hours and the dipping in a 3% sodium hydroxide aqueous solution for 8 hours.

When the resulting product was used as a wall plate of a building, a wall having a deep, beautiful tone of color of marble could be obtained. Further, light stored from the sun in the daytime in fine weather maintained its effect with the high luminosity at night for a long period of time. A good quality was provided owing to the light-emitting portions having a thickness.

Example 2

The components in Example 1 were uniformly mixed by changing the ratio of the silica rock powder to 20%, the ratio of the strontium aluminate luminescent material to 10%, the ratio of natural silica lock to 62% and the ratio of methyl methacrylate (MMA) to 8%. The mixture was pressure-molded by heating to form a plate having a thickness of 21 mm.

Subsequently, the surface was polished using a diamond grindstone and a silicon carbide magnesia grindstone. Further, only the resin portion of the surface was removed at a water jet pressure of 1,100 kg/cm$^2$ (nozzle diameter 0.75 mm, a jet distance 40 mm).

The resulting artificial stone had a depth and a non-slip property in the daytime, and could be seen in the overall thickness direction at night for a long period of time because of the luminescence.

It could be used as a luminous guide mark building material in urgent power failure and thus as an effective artificial stone.

Example 3

In the same manner as in Example 1, a plate having a thickness of 12 mm was formed using the following components,

|  | (% by weight) |
|---|---|
| Transparent natural silica rock | |
| (20 to 70 mesh) | 40 |
| Glass powder | |
| (10 to 30 mesh) | 17 |
| Black pigment coating transparent natural silica rock | |
| (20 to 70 mesh) | 7 |
| Aluminum hydroxide | 10 |
| (average particle diameter 250 mesh) | |
| Strontium aluminate luminescent material | 18 |
| (average particle diameter 200 mesh) | |
| Methyl methacrylate (MMA) | 8 |
| (containing a 0.1% MMA curing agent) | | and polished. A design having a deep tone of marble was obtained.

The thus-obtained plate had a high light-emitting performance for a long period of time throughout the thickness direction by the light emission with the luminescent material even in dark surroundings.

It could be used as a luminous building material.

INDUSTRIAL APPLICABILITY

As stated above, the present invention provides a high-density artificial stone which was excellent in light properties such as a luminousness and the like, which had a deep, glazed, excellent tone of color and good characteristics. Besides, the production of such an excellent product is realized at far lower costs than the ordinary product.

What is claimed is:

1. A luminous or fluorescent artificial stone composition comprising a fine powder component of an inorganic material having a size of from 5 to 70 mesh, a finely divided component of an inorganic material having a size of 100 mesh-under, a luminous or fluorescent component of 100 mesh-under having a luminescence or a luminousness accompanied by ultraviolet absorption, and a resin component, wherein the sum of the weights of said fine powder component of the inorganic material, finely divided component of the inorganic material and luminous or fluorescent component is 89% by weight or more based on the total artificial stone composition, the weight of said resin component is 11% by weight or less based on the total artificial stone composition, a ratio of from 30 to 100% of the weight ($W_1$) of said fine powder component of the inorganic material is a fine powder component of a transparent inorganic material, the ratio of the weight ($W_1$) of said fine powder component of the inorganic material to the sum ($W_2+W_3$) of the weight ($W_2$) of said finely divided component of the inorganic material and the weight ($W_3$) of said luminous or fluorescent component is $$W_1:(W_2+W_3)=1:2 \text{ to } 5:1,$$

and the ratio of the weight ($W_2$) of said finely divided component of the inorganic material to the weight ($W_2$) of said luminous or fluorescent component is $$W_2:W_3=1:2 \text{ to } 10:1.$$

2. The artificial stone composition of claim 1, wherein a ratio of from 30 to 100% of the weight ($W_2$) of said finely divided component of the inorganic material is a fine powder component of a transparent inorganic material.

3. The artificial stone composition of claim 1, wherein the fine powder component of the transparent inorganic material and the finely divided component of the-transparent inorganic material are at least one member selected from the group consisting of quartz, silica rock and a glass.

4. The artificial stone composition of claim 1, wherein the resin component is a methacrylic resin.

5. The artificial stone composition of claim 1, wherein the luminous or fluorescent component is a strontium aluminate luminescent material.

6. The artificial stone composition of claim 1, wherein the fine powder component of the inorganic material is all a fine powder component of a transparent inorganic material.

7. The artificial stone composition of claim 1, wherein the sum of the weights of the inorganic material components and the luminous or fluorescent component is between 89 and 95% by weight based on the total artificial stone composition, and the weight of the resin component is between 5 and 11% by weight based on the total artificial stone composition.

8. The artificial stone composition of claim 1, wherein the ratio $W_1:(W_2+W_3)$ is between 1:1 and 4:1 and the ratio $W_2:W_3$ is between 1:1 and 5:1.

9. The artificial stone composition according to claim 1, wherein the resin component is an acrylic resin, a methacrylic resin or an unsaturated polyester resin.

10. The artificial stone composition according to claim 1, wherein the finely divided component and the luminous or fluorescent component has a size of between 100 and 250 mesh.

* * * * *